2,903,404

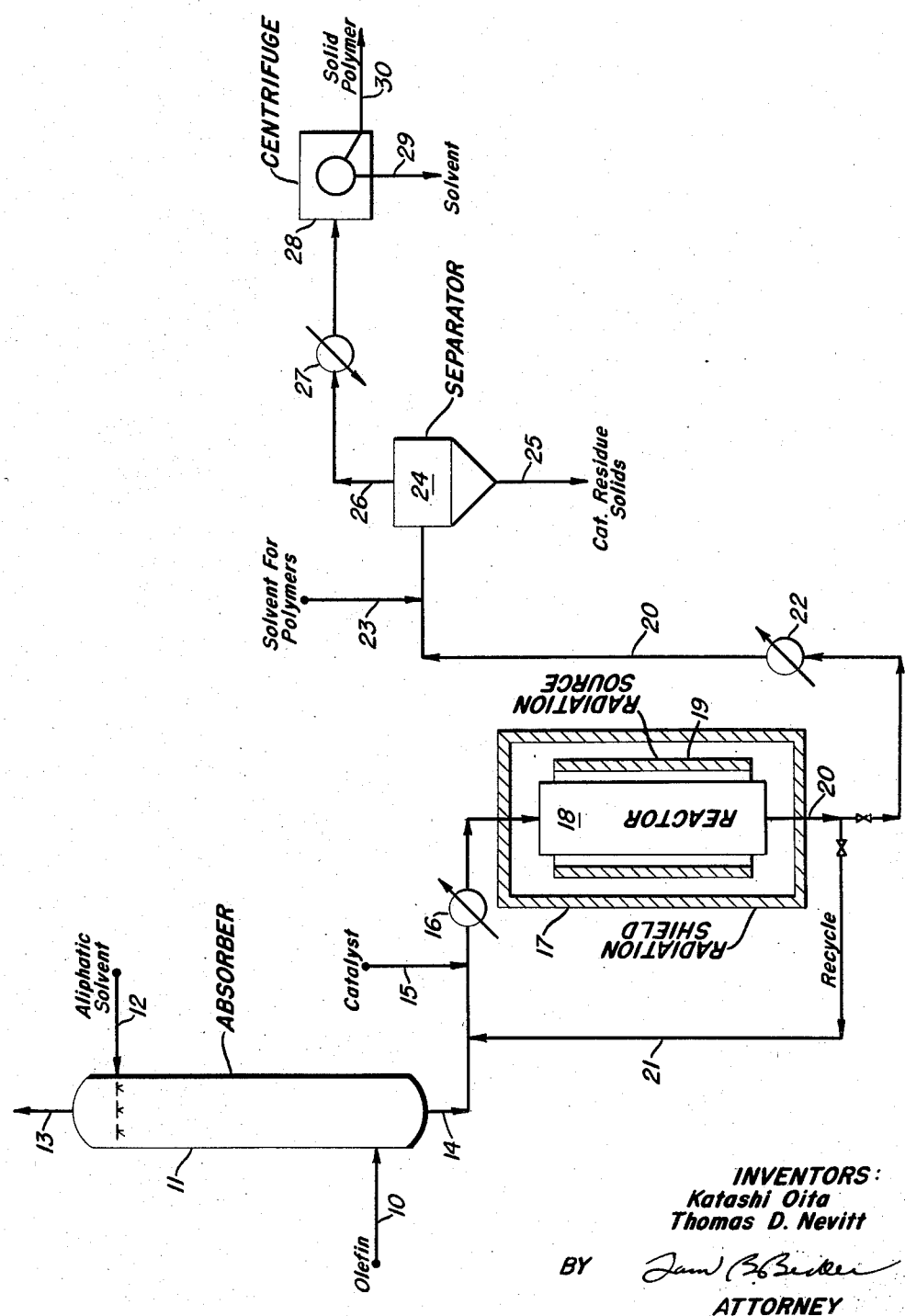

CATALYSIS AND CATALYTIC SYSTEMS

Katashi Oita, Hammond, and Thomas D. Nevitt, Crown Point, Ind., assignors to Standard Oil Company, Chicago, Ill., a corporation of Indiana Application October 4, 1956, Serial No. 613,888

12 Claims. (Cl. 204—162)

This invention relates to novel catalytic systems and processes for the preparation of normally solid polymers of thermoplastic nature from charging stocks comprising essentially a normally gaseous n-alkene, especially ethylene. The present invention provides novel and efficient processes for the homo- or hetero-polymerization of ethylene or other normally gaseous n-alkenes to produce thermoplastic resinous materials of high density and crystallinity.

One object of our invention is to provide new catalytic systems which are effective for the preparation of thermoplastic, highly crystalline resins from ethylene and/or other normally gaseous n-alkenes. Another object is to provide new methods for the preparation of polymerization catalysts. Yet another object is to provide new processes for the polymerization of ethylene, alone or with comonomers, to produce thermoplastic resins of high molecular weight and a density (24/4° C.) of at least about 0.960. A further object is to provide processes for the polymerization of ethylene and the like in which only inorganic catalyst-forming materials are charged. These and other objects of our invention will become apparent from the ensuing description thereof.

The polymerization of ethylene or other normally gaseous n-alkenes can be effected, in accordance with our invention, at substantial and commercially attractive rates, at low temperatures and moderate pressures by contacting the ethylene or other alkene charging stock with a completely inorganic compound of a transition metal selected from groups 4, 5, 6 and the fourth series of group 8 of the periodic system and an ionizing radiation in a dose having an energy equivalent to $10^4$ to $10^7$ REP. The said transition metal compound is preferably a salt, preferably a halide, such as chloride. It is advantageous to use a transition metal salt having essentially covalent characteristics, being therefore soluble in liquid ethylene or charging stock containing the same, for example, a solution of ethylene in a substantially inert hydrocarbon such as an aliphatic hydrocarbon.

While the invention will be described in most detail with respect to ethylene polymerization, it will be understood that it can likewise be applied to the polymerization of propylene or butylenes; such modification of specific operating conditions as may be required to produce optimal results are well within the skill of the art.

It should be understood, however, that all gaseous n-alkenes are not precise equivalents for the purposes of our invention, which in its preferred embodiment is applied to the polymerization of ethylene, especially the homopolymerization of ethylene. Also, the transition metal compounds employed for the purposes of our invention are not precisely equivalent to each other in operating efficiency and otherwise. In its preferred embodiment, our invention is applied through the use of halide salts of transition metals of group 4 of the periodic system, especially $TiCl_2$, $TiCl_3$ and/or $TiCl_4$.

The homo- or hetero-polymerization of ethylene or other normally gaseous alkenes can be effected over an extremely broad temperature range extending from about $-100°$ C. up to about $250°$ C. The rate of ionizing radiation dosage can be varied over a broad range, for example, from 1 to 100 kilo REP per minute or even more, provided that ultimately the polymerization charging stock is subjected to a total dose within the range of $10^4$ to $10^7$ REP per gram of olefin contained in the charging stock.

Ethylene has previously been polymerized by the use of ionizing radiations, alone or with so-called sensitizers such as alcohols, ethers, etc. (British Patent 714,843 of G. D. Buckley and Leslie Seed; J. G. Lewis et al., Chem. Eng. Progress 50, 249–255, May 1954). However, the prior processes known to us have suffered certain disadvantages. Thus, the use of gamma radiation alone has led to polyethylenes having a maximum density of 0.953 at about room temperature and the rates of polymerization were relatively low. The use of organometallic compounds with various transition metal salts (no radiation) has led to polyethylene resins having a maximum density of about 0.955 and, in practice, has suffered the enormous disadvantages of the extreme cost of organometallic derivatives and the serious hazards involved in handling such extremely reactive and pyrophoric materials on an industrial scale.

This invention provides a facile method for the polymerization of ethylene to thermoplastic resins which can be readily worked on available or slightly modified commercial plastic machines, especially to resins having a density (24/4° C.) of 0.960 or more, which is associated with the properties of high crystallinity, excellent low temperature flexibility, low swellability in organic solvents, low permeability to moisture and other vapors, extreme toughness, high tensile strength, high tear resistance, etc. It should be understood that this invention is not concerned with preparation of cross-linked resins or resins of an essentially thermosetting nature, which are stiff, rigid, brittle and essentially non-extensible (of the order of 10% or less at ordinary temperatures) such as have heretofore been produced by exposing conventional polyethylene resins to high energy X-rays or the like.

The process of the present invention can be used to prepare ethylene polymers, propylene polymers, butene polymers and ethylene-propylene copolymers, etc., of widely variant molecular weight ranges and attendant physical and mechanical properties, dependent upon the selection of operating conditions. The inventive process is characterized by extreme flexibility both as regards operating conditions and as regards the products producible thereby. Thus the present process can be effected over extremely broad ranges of temperature and pressure. The practice of the present process can lead to tough, resinous ethylene homopolymers having an approximate specific viscosity ($\times 10^5$) of 10,000 to more than 300,000 $[(\eta \text{ relative} -1) \times 10^5]$. By the term "tough, resinous polyethylene," we mean a polymer having a brittle point below $-50°$ C. (A.S.T.M. Method D746–51T), impact strength greater than two foot pounds per inch of notch (A.S.T.M. Method D256–47T-Izod machine) and minimum elongation at break, at room temperature (25° C.), of 100%.

In a preferred form, the process of the present invention can be used to produce polyethylenes having melt viscosities in the range of $10^5$ to $10^7$ poises at 145° C. and densities (24/4° C.) of 0.96 to almost 0.98, being tough, resinous, thermoplastic materials.

In what follows, our invention will be described in more detail with particular reference to the accompanying Figure and illustrative specific examples thereof.

The charging stock for the present polymerization process preferably comprises essentially ethylene and/or another normally gaseous n-alkene, particularly terminal vinyl alkenes. The alkene charging stocks may contain hydrogen and hydrocarbons, as in refinery gas streams, for example, methane, ethane, propane, butanes, etc. However, it is usually preferred to employ as pure and concentrated alkene charging stocks as it is possible to obtain. When the charging stock contains propylene as well as ethylene, both these olefins may contribute to the production of resinous, high molecular weight products.

It is generally desirable to minimize or avoid the introduction of oxygen, carbon dioxide, water or sulfur compounds into the polymerization system.

Binary or more complex mixtures of the alkenes can be charged to the process of our invention or the individual alkenes can be charged with co-monomers such as acetylene, butadiene, isoprene, styrene and the like, usually in proportions between about 1 and about 25% by weight, based on the weight of alkenes.

In accordance with this invention, depending on the conditions of temperature and pressure and the presence or absence of an added hydrocarbon diluent, ethylene or other alkene charging stock can be polymerized from the gas phase or the liquid phase or in solution in a hydrocarbon diluent. Thus, in the absence of a hydrocarbon diluent and at temperatures above its critical temperature, ethylene or other alkene charging stock can be polymerized as a gas. Even in the absence of a hydrocarbon diluent, liquid ethylene, propylene or 1-butene can be polymerized at temperatures below the critical temperature under a pressure sufficient to maintain the liquid phase. Even at temperatures above the critical, ethylene or other alkene can be polymerized as a solution, for example, of the order of about 2 to 20% by weight (based on the weight of ethylene or other alkene plus hydrocarbon diluent) under a pressure sufficient to maintain the desired concentration of alkene in said solution. The maintenance of suitable phase relationships, as desired, is a matter merely of chemical engineering well within the skill of those working in the art. Suitable aliphatic hydrocarbon diluents or liquid reaction media are set forth in Alex Zletz U. S. Patent 2,692,257, column 8, lines 52 ff. We can employ saturated hydrocarbon diluents such as n-pentane, isopentane, hexanes, heptanes, octanes, nonanes, decanes, etc.; cycloalkanes such as cyclohexane, cyclopentane, alkylcyclohexanes, etc.; olefins such as octenes, dodecenes, etc., especially non-terminal olefins. The liquid hydrocarbon diluent can be treated to remove contained oxygen, water, $CO_2$, etc. by known methods, for example, the method described in Edmund Field and Morris Feller, U. S. Patent 2,691,647, column 9, lines 4 ff.

A wide variety of completely inorganic compounds of transition metals selected from the groups aforesaid can be used for the purposes of our invention, being specifically compounds of Ti, Zr, Hf, Th, V, Nb, Ta, U, Cr, Mo, W, Mn, Fe, Co, Ni or mixtures thereof. In general, we prefer to employ salts of these metals derived from various mineral acids, for example, the hydrohalogen acids; oxyhalides, e.g., titanyl chloride or vanadyl chloride and the like; salts of acids of phosphorus, sulfur, nitrogen, etc. We may also use the specified metal cyanides, cyanates, isocyanates, thiocyanates, isothiocyanates, carbonyls, azides, etc. The salts of carboxylic or sulfonic acids may also be used, e. g. titanium dichloride diacetate. Also, we may use metal derivatives, classified herein as salts, having the formula $M(OR)_n$, wherein M represents the polyvalent metal, R is an alkyl or aryl radical, and $n$ is the valence of M, for example, $Ti(OC_2H_5)_4$, $Ti(OC_3H_7)_4$, $Ti(OC_4H_9)_4$, tetra-2-ethylhexyl titanate, tetrastearyl titanate, tetraphenyl zirconate and the like, for example, the metal derivatives of the enol forms of acetylacetone, acetoacetic ester and the like.

We particularly prefer the use the transition metal halide catalysts, especially those of titanium, e.g. $TiCl_4$, $TiCl_3$, $TiCl_2$, $TiBr_4$, $TiBr_3$, $TiI_4$, etc.

The transition metal catalyst can be supported on various solid materials, such as carbon, silica, alumina, bauxite, fluorided alumina, synthetic or natural aluminosilicates, magnesia, titania, zirconia, powdered aluminum fluoride, sodium fluoride, sodium chloride, cryolite or the like. The supported catalysts can be prepared by known methods, which do not form part of the present invention. Usually the supporting material comprises at least 50 and up to about 99 percent by weight of the total catalyst composition.

It will be understood that for purposes of our invention, a completely inorganic salt of a transition metal is one in which there is no direct bond between a hydrocarbon radical (or substituted hydrocarbon radical) and the metal in question, for example, as in bis-phenyl titanium butylate or the like.

The transition metal salt or other compound should contain said metal in a valence ranging from its maximum positive valence to some intermediate valence state which will not be reduced to metal under the radiation conditions. $TiCl_4$ and $TiCl_3$ are generally advantageous for use in the process of the present invention.

The weight ratio of the transition metal compound to monomer or mixture of monomers is not critical and can be varied broadly over a wide range. Thus the metal compound may be used in proportions ranging from about 0.001 to about 10% by weight, for example, about 0.1 to about 5 w. percent, based on monomer(s); however, even higher concentrations of said metal compounds, based on monomer(s) can be used in some instances.

An important aspect of our invention is the radiation dose, which is here expressed in REP (Roentgen equivalent physical, being equivalent to 93 ergs per g. of absorber). In order to effectuate the purposes of our invention, hereinbefore stated, the dose should fall within the range of $10^4$ to $10^7$ REP. This dose may be imparted to the feed stock in one pass or in a series of passes through the radiation and catalysis zone. The rate of dosage is not critical and can be varied over a broad range of about 1 to about $10^6$ kilo REP per hour, more often falling within the range of about 10 to about $10^4$ kilo REP per hour.

Various ionizing radiations can be employed for the purposes of our invention, for example, gamma- or X-rays, beta-rays (high speed electrons) and various densely ionizing particles such as neutrons, protons, deuterons, alpha particles, etc.

Various "reactors" or sources of ionizing radiations suitable for practicing the present invention are well known and can be applied as such or with suitable modifications (for temperature control, pressure control, pumping of catalyst and reactants, etc.) for the purposes of the present invention. Suitable sources of ionizing radiations include, for example, high energy particle accelerators, nuclear reactors and radioactive isotopes. High energy neutrons can be obtained in nuclear reactors or from other sources. High energy electrons (0.5 mev. to as much as 20 mev.) can be derived from Van de Graaff generators, resonant transformers and linear accelerators. The latter two accelerate only electrons, while the Van de Graaff generator can also accelerate positive ions. Suitable radioisotopes can be used in practicing our invention, for example, a high curie Co–60 source, Cs–137 or the like.

The process of the present invention is distinguished from many of the known processes for the polymerization of ethylene in being readily operable over an extremely broad temperature range, extending from about −100 to about 250° C. More often operations are conducted at temperatures between about 20° C. and about 80° C.

The polymerization reactions of this invention can be effected over a broad range of pressures. Suitable pressures will be selected to maintain a desired concentration of ethylene or other feed stock in a given solvent at a given temperature and otherwise to govern phase relationships within the reaction zone, as will be well understood by those skilled in the art of chemical engineering. Actually, polymerization can be conducted at pressures ranging from one atmosphere or even less up to the maximum pressure which the selected reaction equipment can withstand, for example, 30,000 p.s.i. or even more. A convenient pressure range is about 15 to 1000 p.s.i.a.

We have observed that the salts of transition metals are partially reduced and insolubilized in the solvent in the polymerization reaction zone, and are thus incorporated within the resinous polymer which is produced.

The removal of various inorganic ash-like materials from resinous polyethylenes is well known in the art. Thus polyethylene or ethylene copolymer in solution (about 1 to 10 w. percent concentration) in a hydrocarbon diluent containing also a solid inorganic catalyst can be filtered or centrifuged and then treated with polymer precipitants or antisolvents, such as the various alcohols, ketones such as acetone or the like, etc. Precipitates of polymers containing some of the inorganic catalyst can then be subjected to acid or alkali extraction to remove the inorganic catalyst components therefrom. An alternative technique is to redissolve the polymer in a suitable solvent such as boiling xylenes, thereby leaving inorganic components in a separable form out of solution. These and other techniques are well known in the art of purifying ethylene polymers containing inorganic residues and do not constitute part of the present invention.

The following examples are offered to illustrate our invention without the intent of thereby unduly limiting the same.

*Example 1*

The reactor was a cast iron sausage bomb having a capacity of about 22 cubic inches (360 cc.). It was charged with 150 ml. n-heptane which had been dried with calcium hydride, said n-heptane containing in solution ½ cc. or 0.86 g. of $TiCl_4$ (Baker's C.P. grade). Purified ethylene was pressured into the bomb in the amount of 20 g. The bomb was then sealed and placed in a waterproof container of thin aluminum. The resultant assembly was centrally placed between 4 spent uranium fuel slugs (Argonne high gamma source). The assembly was slowly rotated during irradiation (flux, $10^4$ r./min.) over a period of 1000 minutes, resulting in a total dosage of $1 \times 10^7$ REP per g. ethylene. The temperature during radiation varied between about 78 and about 95° F. and the initial pressure was 290 p.s.i.g. Because of the slow rate of rotation very poor mixing was obtained in the bomb. After irradiation, the bomb was vented at room temperature down to atmospheric pressure and methanol was added to the contents to precipitate the ethylene polymer. The precipitated polymer was filtered and washed with concentrated aqueous hydrochloric acid to effect selective solution of $TiCl_3$ therefrom. ($TiCl_3$ was determined by titration with ferric ammonium sulfate, using ammonium thiocyanate indicator.) A clean white polymer was obtained in the amount of 7.2 g.; the yield of polyethylene recovered was therefore 36 w. percent, based on charge. It was found that this polyethylene had a density (24/4° C.) of 0.961 and a melt viscosity at 145° C. of $1 \times 10^5$ poises (method of Dienes and Klemm, J. Applied Physics 17, 458–471 (1946)). The polymer had a melt point of 128° C. (temperature at which crystallinity disappears when the sample is viewed through crossed Nicol prisms). An X-ray diagram of the polymer indicated a crystallinity of 83%.

In a control run in which no $TiCl_4$ was employed, the yield of polyethylene was 11 w. percent, based on charge, and the polymer was a low molecular weight material having a specific viscosity $\times 10^5$ of 2100 measured at a concentration of 0.125 g. in 100 ml. boiling xylenes.

It will be understood that in lieu of the irradiation source employed in the example, one could employ a Van de Graaff electrostatic generator, $Co^{60}$, $Cs^{137}$ or other radiation sources.

*Example 2*

This operation was generally similar to Example 1 but the total dose was $5 \times 10^6$ REP, or one-half the dose used in Example 1. The sausage bomb was charged with 300 ml. of pure, dry, heptane containing 0.86 g. $TiCl_4$ and about 20 g. ethylene (initial pressure of 290 p.s.i.g. at 25° C.) and irradiated in the same nuclear reactor at about 90° F. The reaction mixture was worked up as in Example 1 and 0.9 g. of resinous polyethylenes were obtained. This polymer had a density (24/4° C.) exceeding 0.97 and a melt viscosity at 145° C. of $8.6 \times 10^4$ poises.

*Example 3*

This operation was generally similar to Example 1 but 0.9 g. of $TiCl_3$ was substituted for the $TiCl_4$ of Example 1. The initial pressure of ethylene in the bomb was 280 and the final pressure was 150 p.s.i.g. The radiation rate was $3.6 \times 10^4$ r./minute and the total dose was $10^7$ REP. The products were worked up as in Example 1 to yield 7.8 g. of solid polyethylenes insoluble in hot n-heptane and a trace of heptane-soluble polymer. The heptane-insoluble polymer had a melting point of 128° C., $d$ (24/4° C.) of 0.9608 and melt viscosity of $4 \times 10^6$ poises. When the process was repeated but the radiation was increased by a factor of 10, the polyethylene yield only doubled, but the melting point dropped sharply to 121° C. and the density to 0.9517.

*Example 4*

When propylene is subjected to the same inorganic compounds and irradiation as have been described above in connection with ethylene polymerization, somewhat lower conversions (compared to ethylene) are obtained to produce normally solid polymers, together with normally liquid polypropylenes.

*Example 5*

A catalyst of 0.5 g. $TiCl_4$ impregnated on 20 g. of an activated gamma-alumina gel was added to a 250 ml. Magne-Dash reactor containing 150 ml. of pure, dry n-heptane and the mixture was pressured with ethylene to 410 p.s.i. at 25° C. The contents of the reactor were magnetically stirred and exposed at 25° C. to a Co-60 source for a total dosage of $10^7$ REP at the rate of $0.6 \times 10^4$ r. per minute. The final ethylene pressure in the reactor was 160 p.s.i. The reactor contents were worked up as before to yield 10.2 g. of heptane-insoluble polymer and 0.5 g. of heptane-soluble polymer. The melt viscosity of this polymer at 145° C. was $10^4$ poises. The density was 0.974 (24/4° C.).

The accompanying figure illustrates a continuous method for practicing the process of the present invention. Numerous obvious chemical engineering details, such as pumps, valves, etc. have been omitted in the interests of simplification.

The ethylene or other alkene charging stock is charged to the process through line 10 into the lower portion of an absorption tower 11. An aliphatic solvent, particularly a normally liquid alkane or cycloalkane, is introduced into the upper portion of the absorption tower through line 12. Unabsorbed residual gases such as hydrogen and normally gaseous alkanes are withdrawn from the upper portion of tower 11 through line 13 and a 2–10 w. percent solution of alkene in the solvent is withdrawn from the lower end of the absorption tower through line 14.

Catalyst is added to the stream in line 14 through line 15. Thus, a dilute solution of $TiCl_4$ in a saturated or other aliphatic hydrocarbon can be introduced into line 15; if desired, finely dispersed $TiCl_3$ or $TiCl_2$ in an aliphatic hydrocarbon medium can be used instead. The metal halide can be used in proportions of about 0.01 to about 5 percent by weight, based on alkene charging stock. The mixture flows thence through a heater 16 wherein its temperature is adjusted to a desired value, usually between about 20° C. and about 200° C., thence through suitable radiation shielding 17 into a reactor 18. The reactor is preferably provided with a suitable stirring mechanism to insure adequate contacting of the alkene feed stock with catalyst, good heat transfer, etc.

The ionizing radiation source of tubular form, 19, is schematically illustrated. It is obvious that many modifications can be made of this detail; for example, the radiation source may be placed within the reactor. The radiation source can be spent uranium fuel slugs, radioactive cobalt, radioactive cesium, a Van de Graaff accelerator, etc.

The residence time of the catalysts and reactants in reactor 18 is adjusted to provide for the accumulation of a suitable radiation dose in the reactor contents in either a single pass or in multiple pass operations. The reaction mixture is withdrawn from reactor 18 and shielding 17 through line 20, whence at least a portion thereof can be diverted through line 21 and recycled to the reactor for multiple pass operations. The net effluent is passed from line 20 through a heater or cooler 22 adapted to control the temperature of the reaction mixture to a suitable level for subsequent treatments.

If desired, an additional portion of solvent for the normally solid polymer can be introduced through line 23 into line 20. The contents of line 20 are discharged into a catalyst separation zone. Thus the solid polymer solution at a concentration of between about 0.1 and about 5 weight percent in an aliphatic hydrocarbon solvent (containing normally solid catalyst residues) can be charged into separator 24, which can take the form of a filter, centrifuge or other equipment having similar function. Preferably the temperature of the stream charged to vessel 24 is between about 85° C. and about 150° C. and the stream is under sufficient pressure to maintain the liquid phase. When a filter is used, it is desirable to use the conventional filter aids such as clays, diatomaceous earths, mixtures of carbon black and acid-treated clays. Catalyst residue is withdrawn from separator 24 through line 25 and liquid effluent is passed through line 26 into a cooler 27 to lower the temperature to the point where normally solid polymer becomes substantially insolubilized in the hydrocarbon medium, usually a temperature between about 20 and 50° C. The cooled contents of line 26 are then passed into a vessel 28 which can be a filter, centrifuge or the like for the separation of solid polymer from solvent medium. The solvent is withdrawn through line 29 and the solid polymer at 30. The solvent can be recycled for use in the process. The polymer product can be treated further to remove residual solvent, traces of polyvalent metal halide catalyst, etc.

The polymers produced by the process of this invention can be subjected to such after-treatment as may be desired to fit them for particular uses or to impart desired properties. Thus, the polymers can be extruded, mechanically milled, filmed or cast, or converted to sponges or latices. Antioxidants, stabilizers, fillers, extenders, plasticizers, pigments, insecticides, fungicides, etc. can be incorporated in the polyethylene and/or in by-product alkylates or "greases." The polyethylenes may be employed as coating materials, binders, etc. to even a wider extent than polyethylenes made by prior processes.

The polymers produced by the process of the present invention, especially the polymers having high specific viscosities, can be blended with olefin resins derived from other processes to impart stiffness or other desired properties thereto. The solid resinous product produced by the process of the present invention can, likewise, be blended in any desired proportions with hydrocarbon oils, waxes such as paraffin or petroleum waxes, with ester waxes, with high molecular weight polybutylenes and with other organic materials. Small proportions between about .01 and about 1 percent of the various polymers of ethylene produced by the process of the present invention can be dissolved or dispersed in hydrocarbon lubricating oils to increase V.I. and to decrease oil consumption when the compounded oils are employed in motors; larger amounts of polyethylenes may be compounded with oils of various kinds and for various purposes.

The products having a molecular weight of 50,000 or more produced by the present invention, can be employed in small proportions to substantially increase the viscosity of fluent liquid hydrocarbon oils and as gelling agents for such oils.

The polymers produced by the present process can be subjected to chemical modifying treatments, such as halogenation, halogenation followed by dehalogenation, sulfohalogenation by treatment with sulfuryl chloride, sulfonation, and other reactions to which hydrocarbons may be subjected.

Having thus described our invention, what we claim is:

1. A process for the polymerization of a normally gaseous n-alkene to produce a normally solid thermoplastic polymer, which process comprises contacting said alkene with a catalytic system consisting essentially of a compound of a transition metal selected from the group consisting of titanium, zirconium and hafnium and having no metal to hydrocarbon radical bond and an ionizing radiation dose in the range of about $10^4$ to $10^7$ REP, and recovering a polymer thus produced.

2. The process of claim 1 wherein said compound is a salt.

3. The process of claim 1 wherein said dose is in the range of about $10^6$ to $10^7$ REP.

4. The process of claim 3 wherein said contacting is effected at a temperature between about 20° C. and about 80° C.

5. The process of claim 1 wherein said alkene is ethylene.

6. The process of claim 1 wherein said alkene is propylene.

7. The process of claim 1 wherein said radiation is gamma radiation.

8. The process of claim 1 wherein said radiation is beta radiation.

9. A process which consists essentially of contacting ethylene with a halide of titanium and an ionizing radiation dose within the range of about $10^4$ to $10^7$ REP at a temperature not in excess of about 250° C. and at superatmospheric pressure not in excess of about 1000 p.s.i.a.; and separating a normally solid polymer from ethylene having a density (24/4° C.) of at least 0.96 and a melt viscosity at 145° C. of at least $10^5$ poises.

10. The process of claim 9 wherein said titanium halide is a titanium chloride.

11. The process of claim 10 wherein said titanium chloride is titanium tetrachloride.

12. The process of claim 10 wherein said titanium chloride is titanium trichloride.

References Cited in the file of this patent

UNITED STATES PATENTS

| 2,437,531 | Huffman | Mar. 9, 1948 |

FOREIGN PATENTS

| 714,843 | Great Britain | Sept. 1, 1954 |

OTHER REFERENCES

Bretton et al.: N.Y.O. 3309, Progress Report No. 2, first quarter (1952).

Ellis et al.: The Chemical Action of Ultraviolet Rays, New York (1941), pp. 409–411.